Oct. 30, 1962 R. W. REICH 3,061,724
RADIATION DETECTION DEVICE
Filed June 10, 1958
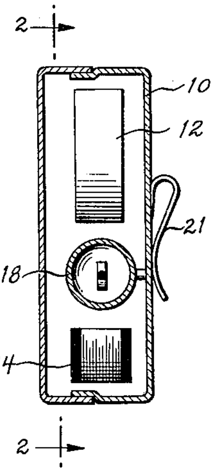
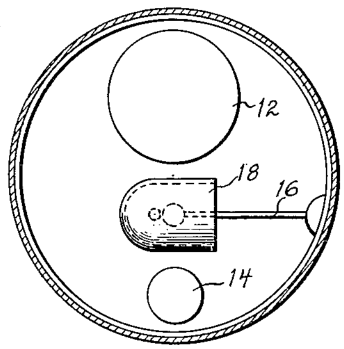
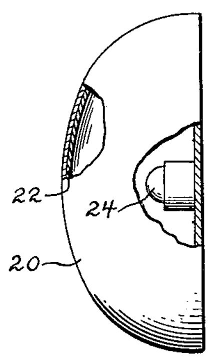
FIG. 4
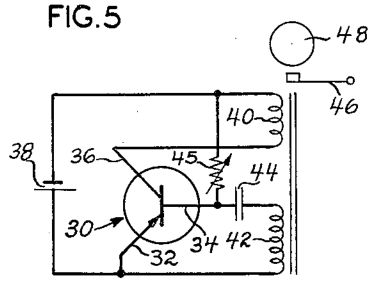
FIG. 6
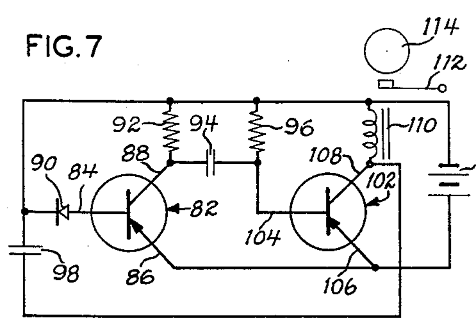
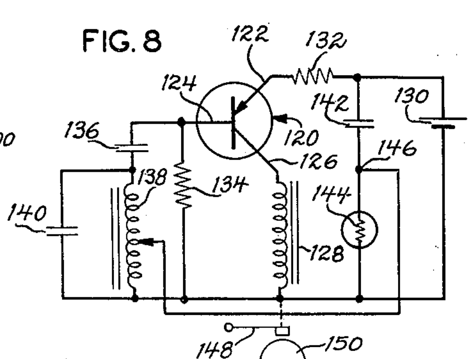
INVENTOR.
ROBERT W. REICH
BY Isidore Match
ATTORNEY United States Patent Office 3,061,724 Patented Oct. 30, 1962

1

3,061,724
RADIATION DETECTION DEVICE

Robert Walter Reich, Rotackerstrasse 2, Freiburg im Breisgau, Germany

Filed June 10, 1958, Ser. No. 741,038
11 Claims. (Cl. 250—71.5)

This invention relates to radiation detection instruments. More particularly, it relates to a radiation detection device which is relatively simple in construction and principle of operation.

There are many known devices for detecting and measuring the intensity of X-ray, alpha, beta and gamma radiation, and the like. These devices may be in the form of geiger-müller counters, proportional counters, ionization chambers, film badges, etc.

All of these devices are either quite complex in their construction thereby necessitating great expense in their manufacture and maintenance and/or require a high degree of technical skill in their operation and interpretation of their indications. Thus, such known instruments essentially are utilized and/or understood by experts.

However, it is necessary to provide a suitable radiation detection instrument for laymen. Such an instrument should require no technical skill and knowledge for its operation, but should be a simple device to warn its bearer when he is in the vicinity of harmful radiation. The instrument should be of small size so that it may be readily carried on the person and should be capable of giving an indication of dangerous radiation without requiring thought or an interpretation of its indications, i.e., when a warning should be given, the bearer's senses should be caused to react.

Accordingly, it is an object of this invention to provide a radiation detector which is a simple device in construction and operation and which is suitable for use by a non-expert.

It is another object of the invention to provide a radiation detector in accordance with the preceding object which provides a warning to the senses of the bearer in the presence of harmful radiation.

Generally speaking, in accordance with the invention, there is provided a radiation detection device comprising a housing which contains therein a phosphor that emits light when it is subjected to radiation such as gamma, X-ray, alpha, beta and the like. A photoresponsive translating device such as a photoconductive semiconductor diode or transistor is disposed within the housing so as to receive the light, such light actuating it into conductivity. The photoresponsive translating device is connected to be an active element in an oscillator circuit. A source of direct current potential is provided, this source being coupled to the oscillator circuit. Thus, when the translating device is subjected to the level of light required to actuate it, the oscillator circuit becomes operative and converts the direct current voltage applied thereto from the potential source to an amplified alternating current voltage of a suitable frequency. Such generated alternating current voltage is utilized to actuate means for providing a readily detectable indication. For example, the last named means may include an output coil having a magnetic core which when magnetized by the alternating current flowing therethrough actuates a buzzer such as a bell and hammer assembly.

For a better understanding of the invention, together with other and further objects thereof, reference is had to the following description taken in connection with the accompanying drawings, and its scope will be pointed out in the appended claims.

In the accompanying drawing, FIG. 1 is an end elevational view of an embodiment of the invention, partly cut away to show a suitable schematic arrangement of elements therein;

2

FIG. 2 is a side elevation of the device of FIG. 1 looking in the direction of the arrows, with the wall at the left of FIG. 1 cut away;

FIG. 3 shows an end elevation partly cut away and partly in section of another embodiment of the housing utilized in the invention;

FIG. 4 shows an elevational view partly in section of a physical arrangement of an embodiment of a radiation sensitive element in the invention; and FIGS. 5 through 8 show schematic diagrams of different examples of circuits which can be used in the invention.

Referring now more particularly to the embodiment depicted in FIGS. 1 and 2, housing 10 may be of cylindrical configuration such as a pillbox and may consist of relatively strong and rigid material which is transparent to radiation such as a suitable plastic or a metal such as aluminum. Contained within housing 10 are an oscillator circuit 12 wherein the active element or translating device therein may be photoresponsive electron discharge device or photoresponsive semiconductor device such as a photodiode or a phototransistor. In the embodiment shown in FIGS. 1 and 2, the phosphor layer is not shown, it being combined in the schematic element 12 depicting the oscillator circuit. The output of the oscillator circuit is developed across a magnetic coil designated by numeral 14. Operatively associated with coil 14 is a pivotally disposed hammer 16 which is reciprocally actuated due to the alternate magnetization and demagnetization of coil 14. During its reciprocal actuation, the end of hammer 16 strikes the inner surface of member 18 which may suitably be spherical or hemispherical such as a shell kernel so that a buzzing sound is presented to the ear. A clip 21 is provided so that the device can be worn as a fountain pen or like structure.

In FIGS. 3 and 4 there is shown suitable arrangements for efficiently utilizing the luminescence of the phosphor in the invention. For example, in FIG. 3 there is shown an alternate configuration of the housing wherein an arcuate profile is presented. The housing 22 has coated on the inner wall thereof a layer 22 of a suitable phosphor. With the configuration of FIG. 3, the light emitted from phosphor layer 22 upon its subjection to radiation is converged onto the surface of the photoresponsive device 24, such as a photoelectric cell, a semiconductor photodiode or a phototransistor. To aid in such convergence and focusing, a convex lens may be provided on the photoresponsive device. Alternately as shown in FIG. 4, the phosphor layer 22 may be applied directly to the glass of the photoresponsive electron discharge device or to the relatively transparent encapsulation of the photoresponsive semiconductor device. Similarly as with the arrangement of FIG. 3, a lens of suitable curvature may be provided to focus the luminescence from the phosphor onto the photoresponsive device. The phosphor may be applied to its underlying support by methods well known in the art and no detailed description of such application is deemed to be necessary.

Since it is intended with the invention to be able to detect any type of radiation that may be present because of nuclear reactions or otherwise, it is necessary that the phosphor layer contain a mixture of phosphors which will luminesce in response to any and all different types of radiation, viz., alpha, beta, gamma, X-ray and the like. For example, for alpha particle, beta particle and proton detection, there can be utilized a phosphor such as the hexagonal-ZnS:Ag or hex-Zns:[Zn] as disclosed for this purpose on page 466 of "An Introduction to Luminescence of Solids," by Humbolt W. Leverenz, 1950, published by John Wiley & Sons, Inc. Another suitable phosphor for detecting alpha particles is a nickel-killed ZnS phosphor as described above. For a discussion of the effect of the addition of impurities to phosphors, see the above-mentioned text by Leverenz, page 333 et seq. Thallium-activated hexagonal zinc sulfide may also be utilized to detect both alpha and beta radiation as may be utilized pure monoclinic naphthalene to detect beta radiation. Single crystal naphthalene may also be utilized to detect gamma radiation as disclosed on page 425 of the aforementioned Leverenz text as may also be utilized monoclinic anthracene for the same purpose. Phosphors which may be utilized to detect neutrons are such phosphors as disclosed on page 468 of the above referred to Leverenz text. To detect thermal neutrons, there may be utilized a material such as phosphor-lithium. In the photoresponsive device, examples of semiconductor materials which are among the most photosensitive are indium antimonide and cadmium sulfide, the latter material also being very sensitive to X-rays.

Referring now to FIG. 5, there is shown an example of an oscillator circuit comprising a phototransistor which may be utilized in accordance with the invention. In FIG. 5, phototransistor 30 comprises an emitter electrode 32, a base electrode 34, and a collector electrode 36. A battery 38 which may be a miniature primary battery or a miniature storage battery, for example, a mercury battery or an alkaline type such as nickel-iron or nickel-cadmium, is provided to provide biasing potentials to the electrodes of transistor 30. Thus, emitter electrode 32 is directly connected to the positive terminal of battery 38, collector electrode 36 being connected to the negative terminal thereof through magnetic coil 40. Emitter electrode 32 is also connected to base electrode 34 through magnetic coil 42 and capacitance 44. Base electrode 34 is also connected to the negative terminal of battery 38 through a variable resistance 45. Coils 40 and 42 may be mounted on a common member having a magnetic core.

In operation, the values of the elements of the circuit of FIG. 5 are so chosen that normally phototransistor 30 is non-conductive. In the presence of radiation, the phosphor layer luminesces, the light produced thereby being applied to the semiconductor body surface of the transistor, such light being preferably focused thereon. The phototransistor, due to the photoconductive effect, will be rendered conductive thereby, and oscillations will be produced in the circuit. The values of the circuit elements may be chosen so that a predetermined amount of luminescence must be provided from the phosphor before transistor 30 is rendered conductive, the values also being chosen in accordance with a desired frequency of oscillation. The magnetic core of oscillator coils 40 and 42 acts as a magnet for hammer 46 so that with the alternating current flowing through the coil due to the oscillator, hammer 46 periodically strikes the bell 48. The core material preferably is of a suitable relatively high frequency magnetic material such as permalloy or ferrite. The frequency of oscillations is chosen to be in the auditory or hearing range.

In FIG. 6, there is shown another example of an oscillator circuit for utilization in accordance with the invention. The circuit comprises a phototransistor 50 similar to transistor 30 of FIG. 5, transistor 50 having an emitter electrode 52, a base electrode 54 and a collector electrode 56. Miniature battery 58 is in the circuit to provide biasing potentials to the electrodes, emitter electrode 52 being connected to the positive terminal thereof through a parallel RC circuit 60 comprising a resistance 62 and a capacitance 64 and a tap connected to a point on coil 66. Collector electrode 56 is connected to the negative terminal of battery 58 through a magnetic coil 68. Base electrode 54 is connected to the positive terminal of battery 58 through a series arrangement of a resistance 70 and coil 66, resistance 70 being shunted by a capacitance 72 and coil 66 being shunted by a capacitance 74. Base electrode 54 is connected to the negative terminal of battery 58 through a resistance 76.

In the operation of the circuit of FIG. 6 similar to that of FIG. 5, the alternating voltage generated through the oscillator action thereof is applied to output magnetic coil 68, the coil as a result thereof causing the periodic striking of bell 78 by hammer 80.

In FIG. 7, there is shown another embodiment of the circuit in accordance with the invention. In this circuit the base electrode 84 of a first transistor 82 is connected to the negative terminal of a minitaure battery 100 through a semiconductor photodiode 90. The emitter electrode 86 is connected directly to the positive terminal of battery 100. The collector electrode 88 is connected to the negative terminal of battery 100 through a resistance 92. The output at collector 92 is coupled to the base electrode 104 of a transistor 102 through a capacitance 94, base electrode 104 being connected to the negative terminal of battery 100 through a resistance 96. The emitter electrode 106 of transistor 102 is connected directly to the positive terminal of battery 100 and the collector electrode 108 is connected to the negative terminal of battery 100 through magnetic coil 110. The output at collector 108 is fed back to the base electrode 84 of transistor 82 through a capacitance 98 and photodiode 90.

In operation, at a given threshold of light intensity, photodiode 90 is rendered conductive whereby transistor 82 conducts. The output at collector electrode 88 applied to base electrode 104 causes transistor 102 to conduct. The circuit generates an alternating voltage and the alternating current flowing through coil 110 causes the reciprocal striking of hammer 112 against bell 114, as previously described in connection with the description of the circuits of FIGS. 5 and 6.

In FIG. 8, where there is shown another example of a circuit which may be utilized in accordance with the invention, the emitter electrode 122 of a transistor 120 is connected to the positive terminal of a miniature battery 130 through a resistance 132, the collector electrode 126 being connected to the negative terminal of the battery through a magnetic coil 128. The base electrode 124 is also connected to the negative terminal of battery 130 through a resistance 134. Shunting resistance 134 is a series arrangement of a capacitance 136 and a magnetic coil 138, coil 138 being shunted by a capacitance 140. Connected in parallel with battery 130 is a series arrangement of a capacitance 142 and a photocell 144 as shown, the junction point 146 of capacitance 142 and photocell 144 being connected to an intermediate point on coil 138.

In operation, the values of the circuit components are so chosen that transistor 120 is normally non-conducting. When photocell 144 is subjected to an amount of light due to the luminescence of the phosphor caused by radiation such that its resistance drops sufficiently to permit transistor 120 to conduct, oscillator action commences and the alternating current flowing through coil 128 causes the consequent reciprocal striking of hammer 148 on bell 150 to produce an audible buzzing sound.

In the above circuits, the miniature battery may be dispensed with and in lieu thereof there may be used photovoltaic cells. Also, there may be used electrets in view of the small amount of power required. With proper choice of circuit values, the photoconductivity of the phototransistor may be utilized and the power source may be dispensed with. Instead of the hammer and bell arrangement, there may be provided a switch actuated by the output magnetic coil to provide a luminous signal. In the even that it is desired to measure the intensity of radiation, there may be provided a suitably sensitive measuring instrument such as a miniature integrating ammeter or other suitable meter.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A portable self-contained radiation detection device comprising a housing consisting of a material which is transparent to nuclear and high frequency electromagnetic radiation, said housing containing therewithin a photoresponsive translating device which is rendered conductive by a predetermined quantity of light applied thereto, means for applying biasing potentials to said photoresponsive translating device, a phosphor material associated with said photoresponsive device which luminesces when subjected to said nuclear and high frequency radiation, an oscillator circuit having said photoresponsive translating device as the active element therein, said biasing potentials being so chosen as to block action of said oscillator until said photoresponsive device is rendered conductive by a given intensity of light, and means responsive to the output of said oscillator circuit for providing an indication of said nuclear and electromagnetic radiation.

2. A portable radiation detection device as defined in claim 1 wherein said photoresponsive translating device is a photoconductive semiconductor diode.

3. A portable radiation detection device as defined in claim 1 wherein said photoresponsive translating device is a phototransistor.

4. A portable radiation detection device as defined in claim 1 wherein said means for applying said biasing potentials is an electret.

5. A portable radiation detection device as defined in claim 1 wherein said means for applying said biasing potentials is a miniature primary battery.

6. A portable radiation detection device as defined in claim 1 wherein said means for applying said biasing potentials is a miniature secondary battery.

7. A portable radiation detection device as defined in claim 1 wherein said means for providing an indication comprises a buzzer.

8. A portable radiation detection device as defined in claim 1 wherein said means for providing an indication comprises an electric meter.

9. A portable self-contained instrument for the detection of the presence of radiation in an amount exceeding a chosen level comprising a housing, said housing containing therein a phosphor material which luminesces when subjected to radiation of the type to be detected, the intensity of the luminescence produced by said phosphor being related to the intensity of said radiation applied thereto, an oscillator circuit, a photo-responsive semiconductor translating device included as an active element of said oscillator circuit, means for applying biasing potential to said oscillator circuit, said biasing potential being selected so that said oscillator circuit draws current and produces an output only when said radiation is present in an amount exceeding said chosen level whereupon the intensity of light applied to said translating device from said phosphor material is sufficient to actuate said oscillator, and means responsive to the output of said oscillator circuit for providing an indication of the presence of said radiation.

10. A portable self-contained radiation detection instrument comprising a housing containing therein means which emits light upon being subjected to radiation of the type to be detected, the intensity of the light produced by said means being related to the intensity of the said radiation being applied thereto, means for applying at least a portion of the radiation which impinges upon said said housing to said first named means, a photo-responsive semiconductor translating device which is made conductive by a chosen threshold of intensity of light, lens means for applying said light to said translating device, an oscillator circuit which includes said translating device as an active element thereof, a direct current potential source having its output coupled to the input of said oscillator circuit, said oscillator circuit drawing current and converting the direct current voltage from said potential source to an alternating current voltage only when the light emitted by said first named means reaches said threshold intensity, the values of said circuit being chosen so that it ceases to convert said direct current voltage to an alternating current voltage when the intensity of said light drops below said threshold level, and means coupled to the output of said oscillator circuit, responsive to the application thereto of said alternate current voltage, for providing an indication of the presence of radiation.

11. A portable self-contained radiation detection instrument comprising a housing containing therein a phosphor which emits light upon being subjected to radiation of the type to be detected, the intensity of the light produced by said phosphor being related to the intensity of the said radiation applied thereto, means for applying at least a portion of the radiation which impinges upon said housing to said phosphor, a photoresponsive semiconductor translating device, an oscillator circuit which includes such translating device as an active element thereof, lens means for transmitting the light produced by said phosphor to said translating device, biasing means for maintaining said oscillator circuit in a quiescent state until said translating device is made conductive by a chosen threshold intensity of light, a direct current potential source having its output coupled to the input of said oscillator circuit, said oscillator circuit drawing current and converting the direct current voltage from said potential source to an alternating current voltage only when the light emitted by said phosphor reaches said threshold intensity, the values of said circuit being chosen so that it ceases to convert the direct curent voltage to an alternating current voltage when the intensity of said light drops below said threshold level, transformer means directly connected to the output of said oscillator circuit and a bell connected to the output of said transformer for providing an audible indication of the presence of radiation in an amount sufficient causing said phosphor to make said translating device conductive.

References Cited in the file of this patent

UNITED STATES PATENTS

| | | |
|---|---|---|
| 2,496,886 | Malloy | Feb. 7, 1950 |
| 2,708,242 | Ruben | May 10, 1955 |
| 2,728,861 | Glass | Dec. 27, 1955 |
| 2,817,768 | Shamos | Dec. 24, 1957 |
| 2,839,678 | Dewitz | June 17, 1958 |
| 2,885,562 | Mariance | May 5, 1959 |
| 2,899,560 | Newet | Aug. 11, 1959 |
| 2,942,110 | Lehovec | June 21, 1960 |

OTHER REFERENCES

Transistors in Radio and Television by Kiver, McGraw-Hill Book Company, Inc., New York, 1956, pages 203–211.